May 13, 1952 — E. L. KIRK — 2,596,933
MEANS FOR WELDING PLASTIC FILMS
Filed Jan. 31, 1951

INVENTOR.
Elmer L. Kirk
BY
Griswold & Burdick
ATTORNEYS

May 13, 1952   E. L. KIRK   2,596,933
MEANS FOR WELDING PLASTIC FILMS
Filed Jan. 31, 1951

INVENTOR.
Elmer L. Kirk
BY
Griswold & Burdick
ATTORNEYS

Patented May 13, 1952

2,596,933

UNITED STATES PATENT OFFICE 2,596,933

MEANS FOR WELDING PLASTIC FILMS

Elmer L. Kirk, Midland, Mich., assignor to The Dow Chemical Company, Midland, Mich., a corporation of Delaware Application January 31, 1951, Serial No. 208,732

3 Claims. (Cl. 219—19)

This invention relates to a heating element for use in welding superposed layers of thermoplastic films. It relates in particular to a heating element adapted to furnish simultaneously, across the intended weld area, a plurality of temperature conditions ranging above and below the optimum welding temperature of the plastic to be treated.

The heating means of the present invention may be used in connection with any thermal welding apparatus for plastic films. Many types of such apparatus are known, and one especially useful machine is that disclosed by Lowry and Church in U. S. Patent 2,469,972. In the said prior patent, it is disclosed to supply heat to the welding elements or "heating shoes" from a point as near as possible to their working surfaces. It has been found that, with the said prior arrangement of elements, the action of the necessary "off-on" switch in control of the heating element results in pulsations of heat and corresponding fluctuations of temperature at the toe, or working face, of the heating shoes. Sudden upsurges of temperature sometimes blister or even char the film being supplied for welding, while a change of temperature in the opposite direction may leave the working face of the heating shoe so relatively cool that no welding occurs, or very poor welds are formed.

It is accordingly an object of the present invention to provide a means for heating plastic film to a welding temperature without risk of temperature fluctuations of such significance at the working face of the welding element as to produce weak or unsatisfactory welds. It is a related object to provide a welding means for use on thermoplastic film, comprising a heating shoe and a temperature control such that there exist simultaneously across the working face of the shoe an ascending and a descending temperature gradient, each spanning the optimum welding temperature for the film to be welded. A further object is to provide a means as aforesaid which will produce simultaneously in thermoplastic film being supplied thereto a pair of substantially parallel perfectly formed linear welds. Other and related objects may appear hereinafter.

It has now been found that these and related objects may be realized through the employment of a particular configuration of heating shoes, used in opposed pairs, with particular locations of the heat source and of the thermoswitch, all taken together with a preferred modulating circuit for the electrical elements of the assembly, as will be explained more fully hereinafter with reference to the annexed drawing.

In the said drawing.

Figure 1:
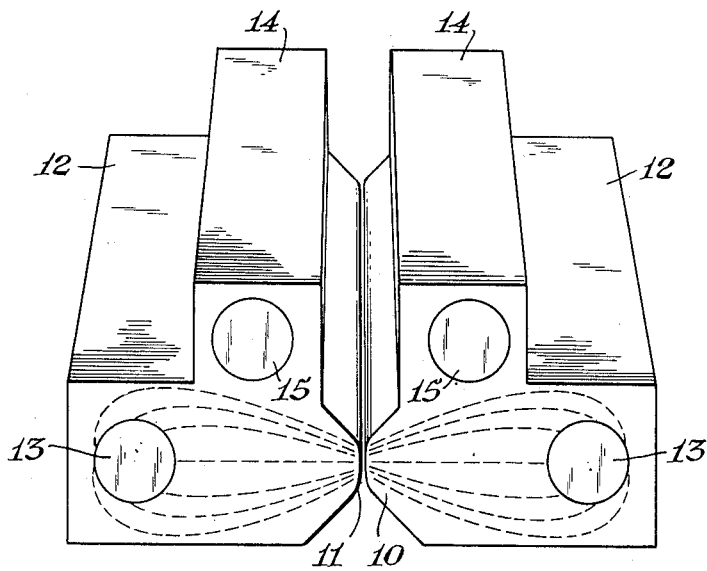
Fig. 1 is a perspective view of a pair of the welding shoes of the present invention, in working position.

The welding shoes of the present invention, illustrated in Fig. 1, are each made from a single piece of metal, which is preferably copper or similarly dense and thermally conductive material with a high heat capacity. Each shoe consists of a toe 10 having a working face 11, a rearwardly extending solid metal main body 12 drilled at a distance from and parallel to face 11 to provide a socket 13 for insertion of an electric resistance heater (not shown), and a monitor member 14 vertical to the main body 12, disposed rearwardly from the working face 11 and ahead of heater socket 13, said monitor 14 having a socket 15 therein for a heat sensitive switch (not shown), out of the direct paths of heat flow from socket 13 to working face 11 of toe 10.

Figure 2:
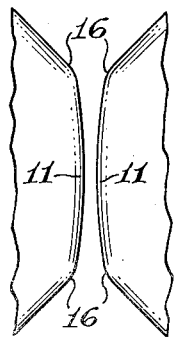
Fig. 2 is an enlarged view of the toes of a pair of such welding shoes, in elevation.

The working face 11 of each shoe, as shown in Fig. 2, is slightly crowned between its upper and lower margins 16 so that, when a pair of such faces 11 are brought into working contact with a plurality of plastic films to be welded, there is progressively less pressure on the portions of film disposed laterally of and parallel to the more highly compressed weld area.

Figure 3:
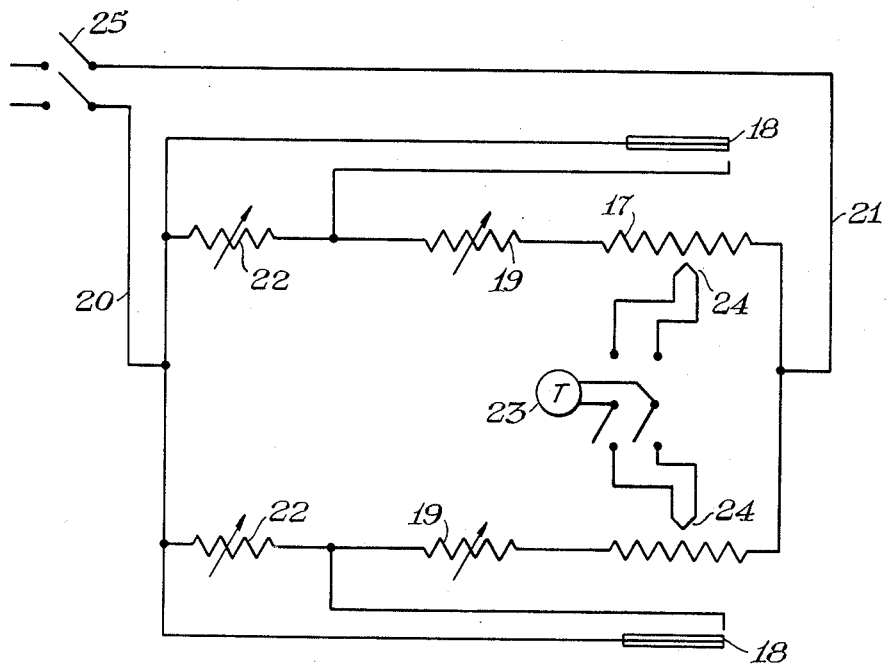
Fig. 3 is a schematic drawing of an electrical circuit for use with the welding shoes.

Fig. 3 illustrates a type of electrical circuit for use with the welding shoes of Fig. 1. A "cartridge" heater, or other resistance element 17 is inserted in socket 13 of each welding shoe. A heat-sensitive switch 18 is installed in socket 15 of each shoe. A main rheostat 19 is connected in series between the switch 18 and resistor 17 of each shoe, while switch 18 and resistor 17 are connected at their opposite ends to the power source, through lines 20 and 21, respectively. An auxiliary rheostat 22 is bridged between power line 20 and main rheostat 19. The temperature in each heating shoe near resistor 17 may be determined at any time by reference to an indicating or recording thermometer 23 which is connected with a thermocouple 24 near the resistor 17.

When preparing for operation of the welding apparatus, the heating elements are connected with the power source by closing main switch 25. Thermoswitch 18 remains closed until resistor 17 reaches the required temperature. Auxiliary rheostat 22 is shorted out and current flows through switch 18, which acts as a shunt, and through main rheostat 19 to resistor 17. The high value of heat input is under control of main rheostat 19. When the desired temperature is reached, switch 18 opens and current can only flow to resistor 17 through auxiliary rheostat 22 and main rheostat 19, in series. The differential between the high value and the low value of energy input to the welding shoe is under control of the auxiliary rheostat 22, which may be set to reduce the current reaching resistor 17 to a value which will just barely maintain the desired temperature in the heating shoe. When rheostat 19 is set so that the high value of energy input is slightly greater than required for optimum operating temperature, and rheostat 22 is set so that the low value of energy input is just less than required to maintain this temperature, pulsations are kept to a minimum amplitude.

The paths of heat flow from resistor 17 in socket 13 to the working face 11 of one of the welding shoes are shown by dotted lines in Fig. 1. It is noted that thermoswitch 18 in socket 15 is located outside the general paths of heat flow. Hence, any variations in temperature in the main body 12 of the welding shoe, due to pulsations in the heat input, are damped by the heat capacity of the large mass of metal between sockets 13 and 15 and between socket 15 and the working face 11 of toe 10. Location of the thermoswitch 18 and its socket 15 as near as possible to toe 10, but still outside the general paths of heat flow, insures that the temperature at the thermoswitch and that at the face 11 of toe 10 will be very nearly the same.

Figure 4:
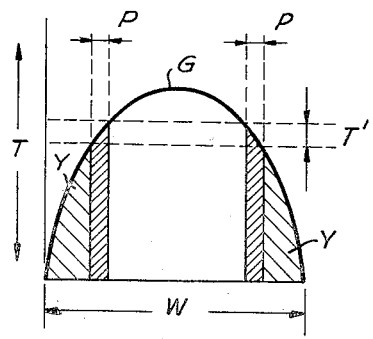
Fig. 4 is a graph showing the distribution of heat across the heated area of thermoplastic film subjected to the action of the new welding means.

While some thermoplastic films have no sharply defined fusion temperature, and may be welded at any temperature in a considerable range, others are submicroscopically crystalline and exhibit very sharp melting points. In the latter type of materials, satisfactory welds can only be made if the films are brought into contact with one another, under pressure along the desired weld line, at a temperature within a very few degrees above the crystalline melting point. Because of the poor thermal conductivity of thermoplastics, a thick film will require the welding shoes to be at a higher surface temperature, in order to bring the opposed film surfaces to the optimum condition for welding, than is required when welding thin films of the same composition. In practice, it is known that commercial thermoplastic films vary by several per cent in thickness, within a single sheet. Furthermore, a film welding machine is expected to be able to seal assemblies of plastic films of varying thicknesses without change in setting of the thermal controls of the machine. This can only be accomplished in a practical manner if there is a variation in temperature across the face of the welding shoe, from a few degrees below the minimum required temperature to a few degrees above the maximum required temperature. This condition is readily maintained in the welding shoes of the present invention. It is observed in Fig. 1 that the main paths of heat flow from resistor 17 to working face 11 converge and concentrate near the center of that face, while the edges of the working face 11 received considerably less heat. The result, expressed as a temperature gradient, G, across the face of the welding shoe, is illustrated in the graph of Fig. 4, wherein the ordinate, T, represents temperature and the abscissa, W, represents the width of the heated area of thermoplastic film in contact with the welding shoes. For a given thickness of films of a particular composition, the heating shoe must be at a temperature in the narrow range T' to effect perfect sealing of the films. When the intersections of the temperature band T' with the curve G, representing the temperature gradient across the affected area, are projected upon the abscissa W, the resulting bands P illustrate the width and location of the area in which perfect welding occurs. When the apparatus is used for the common purpose of sealing the open tops of film bags filled with merchandise, the location of T' along ordinate T will vary with the thickness of films being acted on and with the rate of traverse of the bags through the machine, and the location of the perfectly sealed bands P will move correspondingly within the heated width W of the plastic film. Greater film thicknesses, or higher rates of traverse of the films through the welder, will require higher values of T', and the perfectly welded area P will be nearer the center of the heated zone. Between the two perfectly welded areas P there is an area in which the films are thoroughly fused together but in which they may not exhibit maximum strength. This centrally disposed band is protected from strain by the perfectly sealed bands P on each side, and these, in turn, are flanked by bands of film which have been heated insufficiently to effect perfect fusion. These latter bands Y, when subjected to stresses such as are encountered in film packaged merchandise when handled, tend to yield to such stresses, and the latter are then distributed along a considerable length of the welded band P. The nearer one approaches the bands P in evaluation of the strength of the seal, the stronger it is found to be.

It is understood that, where reference has been made herein to variable resistances (rheostats) for controlling the energy input to the heating element, there may be used instead variable inductance reactors or variable voltage transformers, without altering the principle of the invention, and it is intended that such control means be deemed the equivalents of the ones described.

I claim:

1. In a machine for welding superposed layers of thermoplastic films, an opposed pair of welding shoes made of a dense and thermally conductive metal of high heat capacity, each such shoe having a toe with a slightly crowned working face, a rearwardly extending solid metal main body with a socket distant from and parallel to said working face, for insertion of a heating element, and a monitor member vertical to the said main body, disposed rearwardly from the working face and ahead of the heater socket, said monitor having a socket therein out of the direct paths of heat flow from the heater to the working face, for insertion of a thermoswitch.

2. In a machine for welding superposed layers of thermoplastic films, an opposed pair of welding shoes made of a dense and thermally conductive metal of high heat capacity, each such shoe having a toe with a slightly crowned working face, a rearwardly extending solid metal main body with a socket distant from and parallel to said working face, an electric heating element in said socket, a monitor member vertical to the said main body, disposed rearwardly from the working face and ahead of the heater socket, said monitor having a socket therein out of the direct paths of heat flow from the heater to the working face, and a thermoswitch in said monitor socket, electrically connected in series with said heating element through a rheostat to control the flow of current to said heating element.

3. In a machine for welding superposed layers of thermoplastic films, an opposed pair of welding shoes made of a dense and thermally conductive metal of high heat capacity, each such shoe having a toe with a slightly crowned working face, a rearwardly extending solid metal main body with a socket distant from and parallel to said working face, an electric heating element in said socket, a monitor member vertical to the said main body, disposed rearwardly from the working face and ahead of the heater socket, said monitor having a socket therein out of the direct paths of heat flow from the heater to the working face, a thermoswitch in said monitor socket electrically connected in series with said heating element through a rheostat and a second rheostat connected in series with a power source and with the first said rheostat and in parallel with said switch.

ELMER L. KIRK.

REFERENCES CITED

The following references are of record in the file of this patent:

UNITED STATES PATENTS

| Number | Name | Date |
|---|---|---|
| 2,227,497 | Hallman | Jan. 7, 1941 |
| 2,469,972 | Lowry et al. | May 10, 1949 |